UNITED STATES PATENT OFFICE.

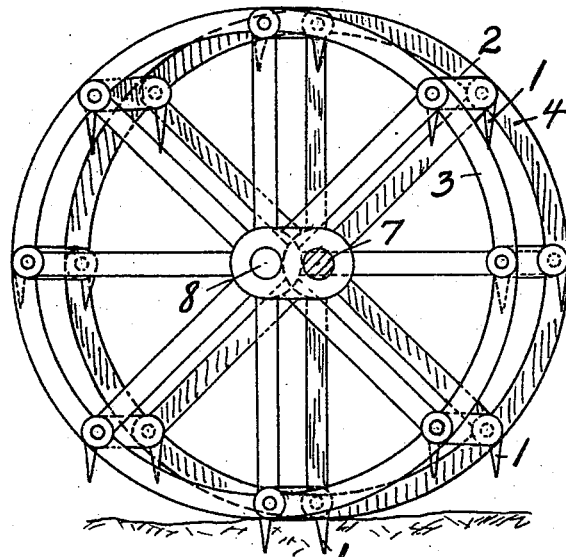
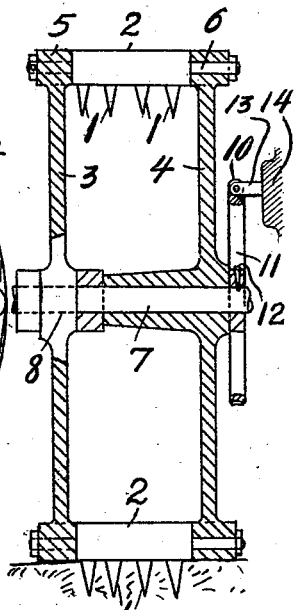
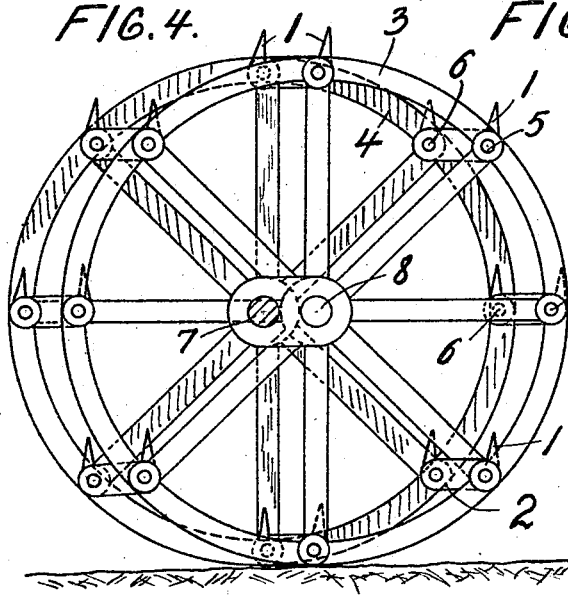
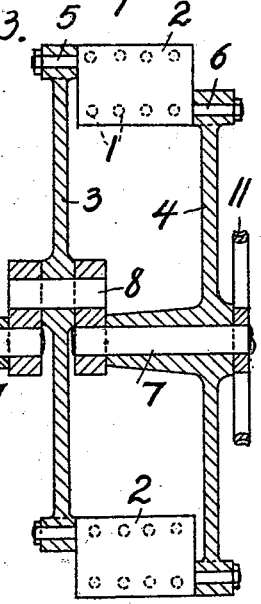

ERIK LAURITSEN VARLO, OF KONGSBERG, NORWAY.

WHEEL ARRANGEMENT FOR AGRICULTURAL MACHINERY AND THE LIKE.

1,413,303.  Specification of Letters Patent.  Patented Apr. 18, 1922.

Application filed January 21, 1919. Serial No. 272,336.

*To all whom it may concern:*

Be it known that I, ERIK LAURITSEN VARLO, of Kongsberg, in the Kingdom of Norway, a subject of the King of Norway, have invented certain new and useful Improvements in Wheel Arrangements for Agricultural Machinery and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

It is usual in agricultural machinery to provide the wheels with ribs or the like in order to make the wheel grip the ground firmly.

The ordinary ribs used on these kinds of wheels have however the disadvantage that they act to break up the ground during the rotation of the wheel, and for this reason the ribs generally have to be made quite low, so that their gripping effect is often not sufficient for agricultural machines such as mowing machines where the machinery is driven from the wheels.

The present invention has for its object a wheel arrangement by means of which it is made possible to make the gripping ribs or teeth sufficiently high to always grip the ground without breaking up the same. According to the present invention this is obtained by composing each wheel of a pair of discs rotating about parallel noncoaxial trunnions and connected at their circumference by means of links, which serve to carry the gripping teeth of the wheel pair.

Preferably one disc of the wheel may be mounted on a trunnion adapted to pivot about the axis of the other wheel in the manner of a crank so that the position of the wheels with regard to each other may be changed with the object of changing the position of the gripping teeth.

On the drawing:

Fig. 1 is a side view of the wheel.

Fig. 2 is a vertical sectional view of the same.

Fig. 3 is a horizontal sectional view of the wheel and

Fig. 4 is a side view similar to Fig. 1, but with the wheels in a different position.

The gripping teeth 1 are formed on or fastened to one side of the series of links 2 which are pivotally connected to wheels 3, 4, as by trunnions 5, 6, respectively. A stationary shaft 7 is carried in any suitable manner by the machinery frame and furnishes a support for wheel 4. A second shaft or wheel axle 8 which is offset from and rigidly connected to shaft 7 provides a support for wheel 3. Obviously, the axial distance between the trunnions 5, 6 is the same as the axial offset of shaft 8 from shaft 7. Wheels 3, 4 are of the same diameter and with the wheels resting on level ground the shafts 7 and 8 lie in the same horizontal plane. The trunnions 5, 6 of the respective links 2 are arranged in planes parallel to the plane through shafts 7, 8, and it therefore follows that the links 2 will lie in planes substantially parallel to the surface of the ground upon which the wheels rest. A worm 10 is carried on a support 13 which is mounted on the machinery frame 14, and said worm 10 engages a gear 11 which is carried by and connected to shaft 7 as by means of key 12.

With shafts 7, 8 lying in a horizontal plane the links 2 will be horizontal and the teeth 1 will be directed towards or away from the ground according to the location of shaft 8 with respect to the shaft 7. As shown in Fig. 1, shaft 8 lies to the left of shaft 7 and the teeth 1 are in engagement with the ground. For traveling along roads etc. the teeth 1 are turned into position away from the ground by rotating shaft 7 through worm 10 and gear 11 to throw the shaft 8 to the opposite side of shaft 7, as is shown in Fig. 4.

I claim:

1. A wheel arrangement for agricultural machinery or the like comprising a shaft, a second shaft rigidly connected and parallel to the first shaft and located in substantially the same horizontal plane, a pair of wheel members resting on the ground and journaled on said shafts, bearings along the circumference of said wheel members, links provided with trunnions which are journalled in said bearings, the axial distance between said trunnions being equal to the axial distance between said shafts, ground engaging means carried by one face of said links, and means for shifting the relative position of said shafts for throwing the ground engaging face of said links into and out of operative position.

2. A wheel arrangement for agricultural machinery or the like as specified in claim 1, in which the means for shifting the relative position of the shafts comprises a worm carried by the machinery frame, and a gear mounted on one of said shafts.

3. A wheel arrangement for agricultural machinery or the like as specified in claim 1, in which the means for shifting the relative position of said shafts revolves said second shaft through an angle of 180° about said first shaft, thereby revolving said links through an angle of 180°.

In testimony that I claim the foregoing as my invention, I have signed my name in presence of two subscribing witnesses.

ERIK LAURITSEN VARLO.

Witnesses:
 DAGNY VOSS,
 C. VARMAN.